G. A. AMSDEN.
CABLE CARRIER APPARATUS.
APPLICATION FILED AUG. 25, 1905. RENEWED JAN. 6, 1910.
960,617.
Patented June 7, 1910.
6 SHEETS—SHEET 2.
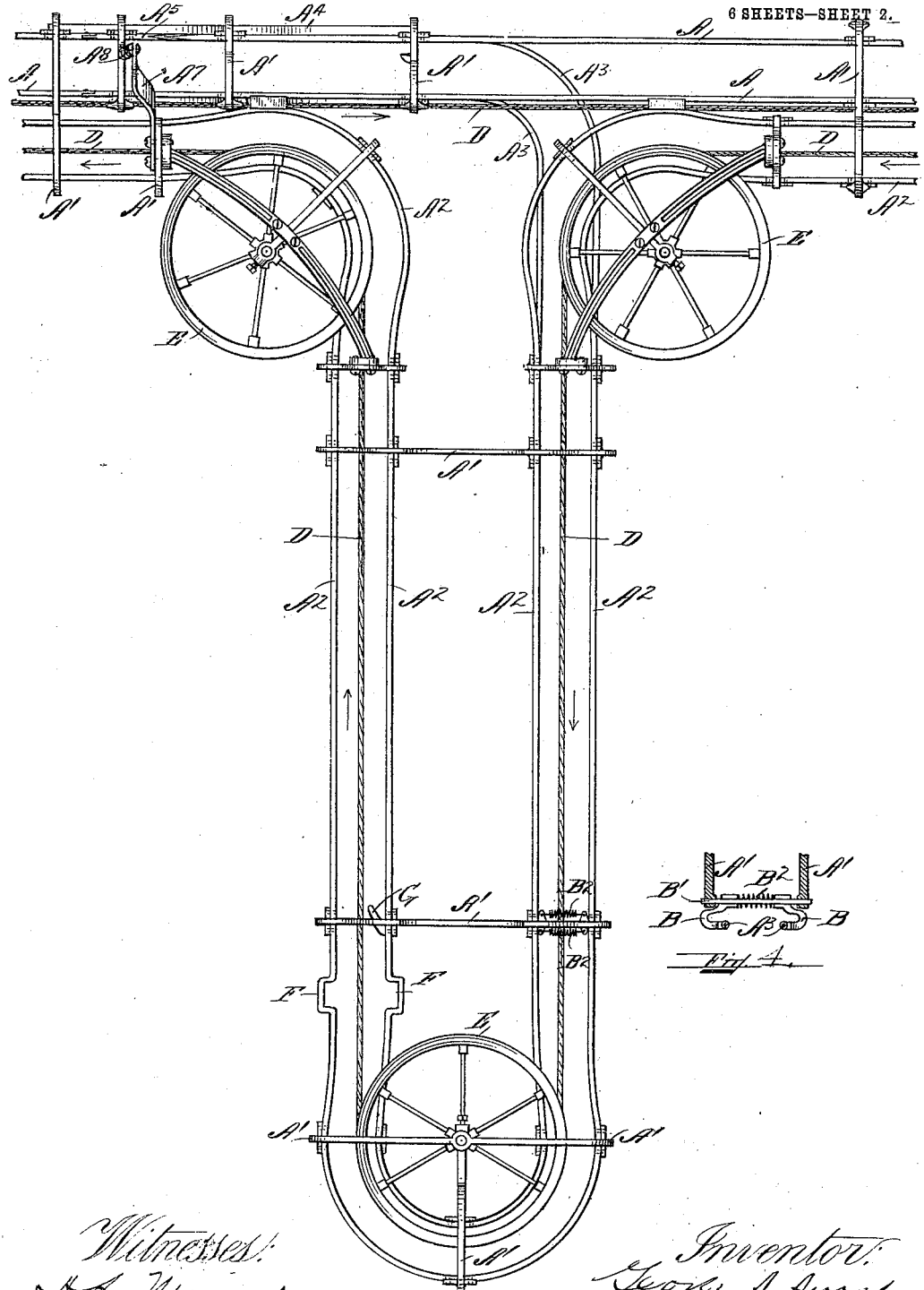

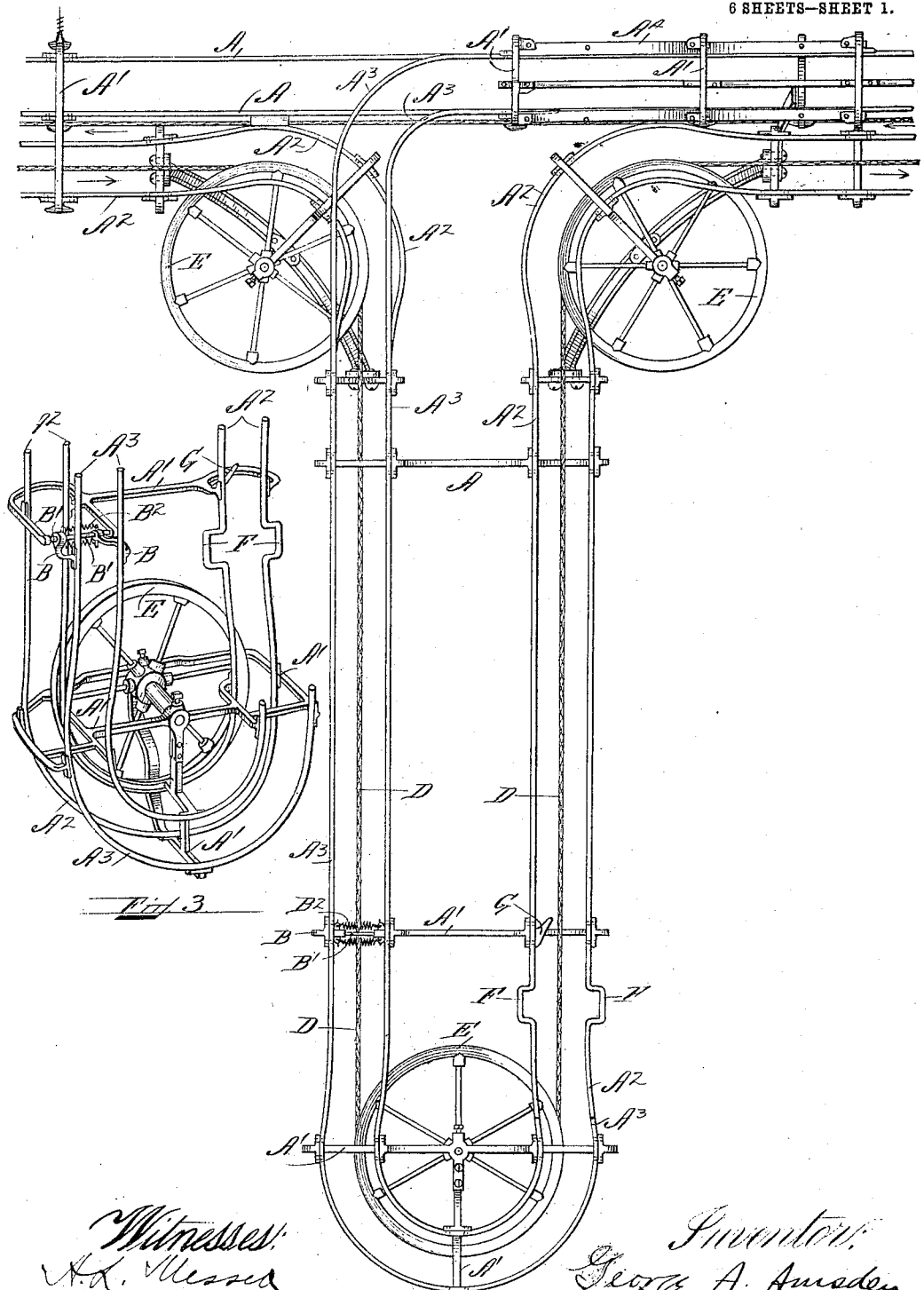

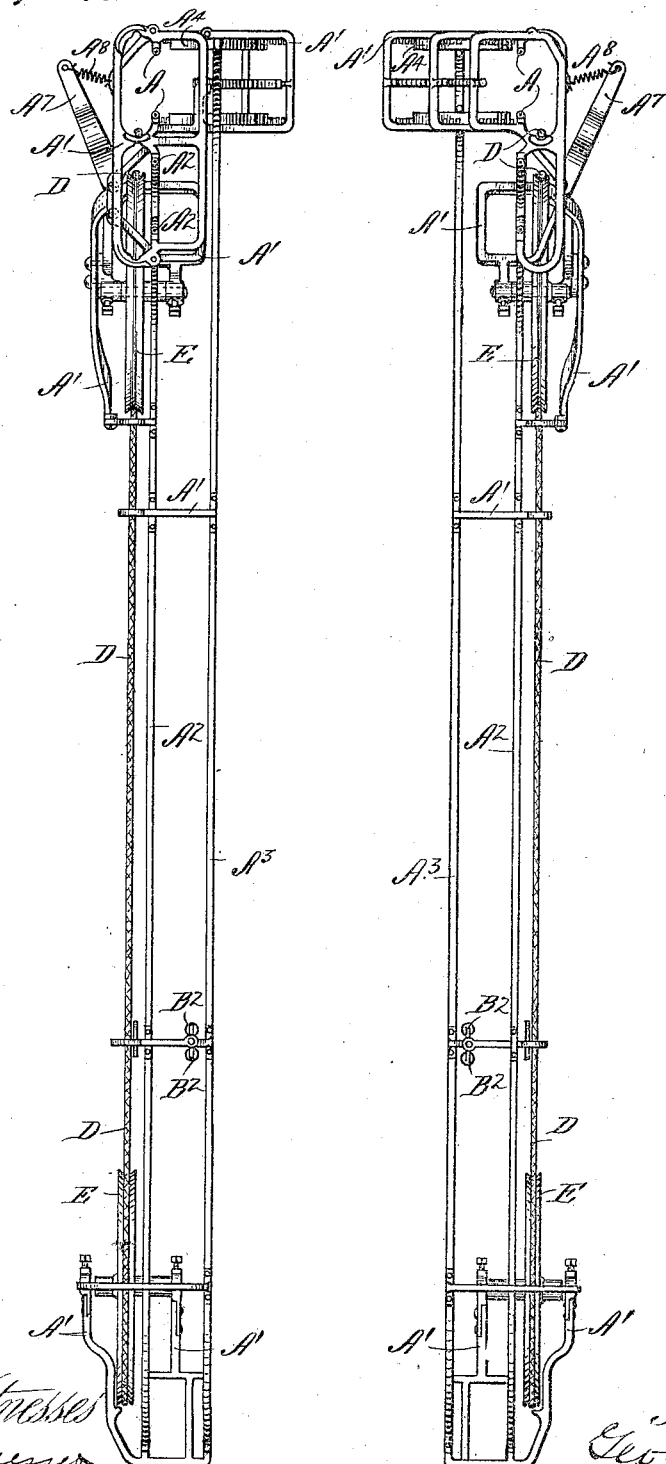

G. A. AMSDEN.
CABLE CARRIER APPARATUS.
APPLICATION FILED AUG. 25, 1905. RENEWED JAN. 6, 1910.
960,617.
Patented June 7, 1910.
6 SHEETS—SHEET 4.
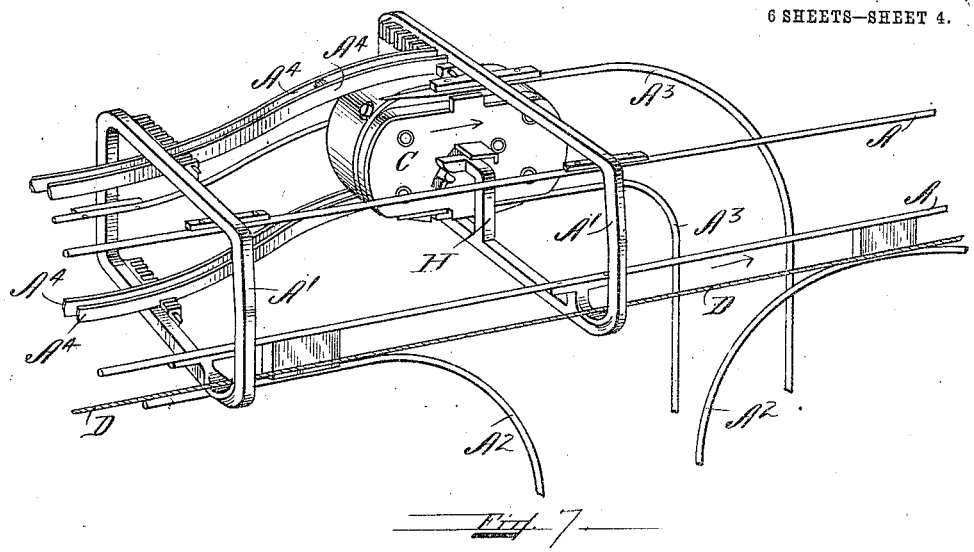
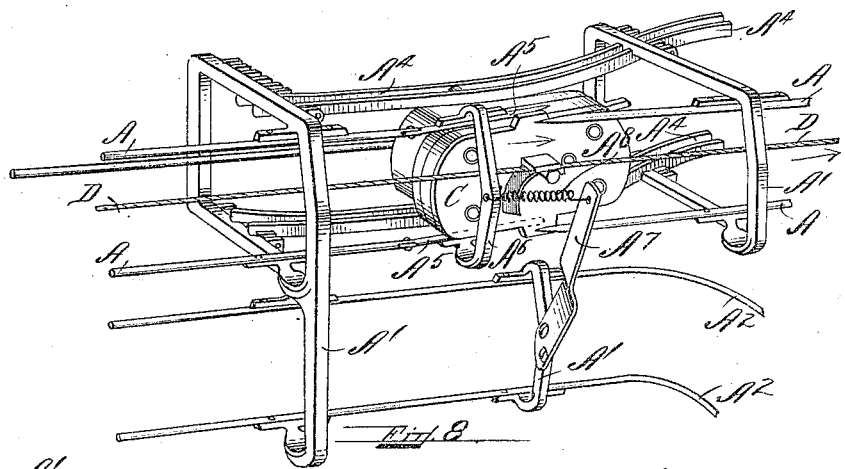
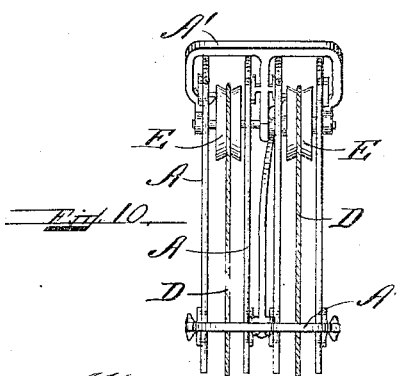
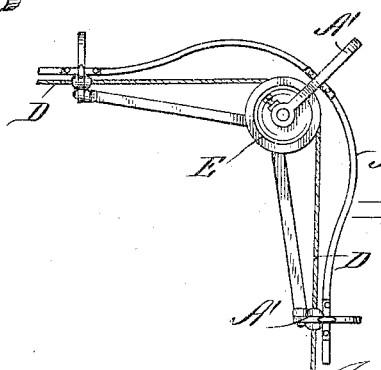

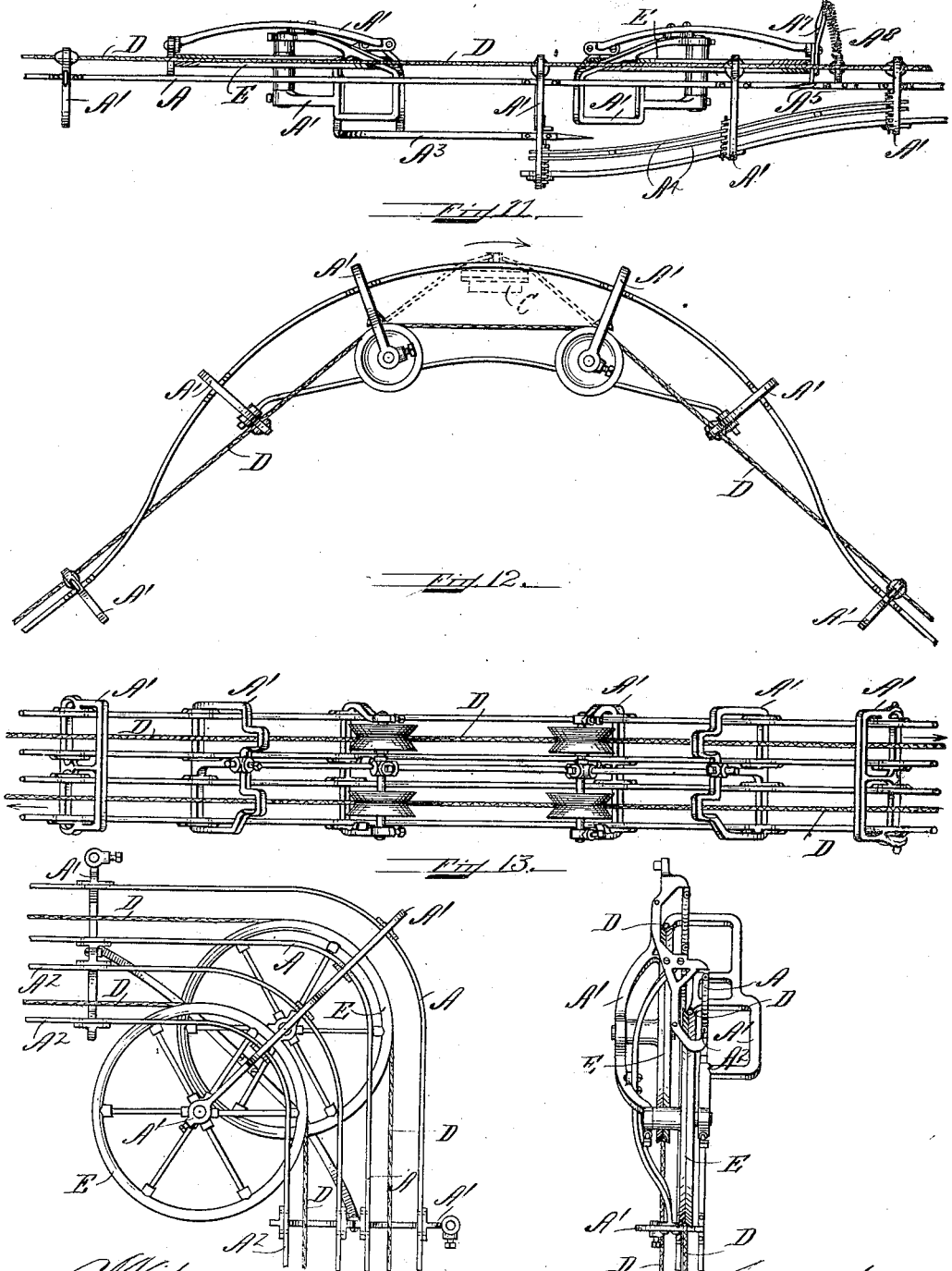

G. A. AMSDEN.
CABLE CARRIER APPARATUS.
APPLICATION FILED AUG. 25, 1905. RENEWED JAN. 6, 1910.
960,617.
Patented June 7, 1910.
6 SHEETS—SHEET 6.
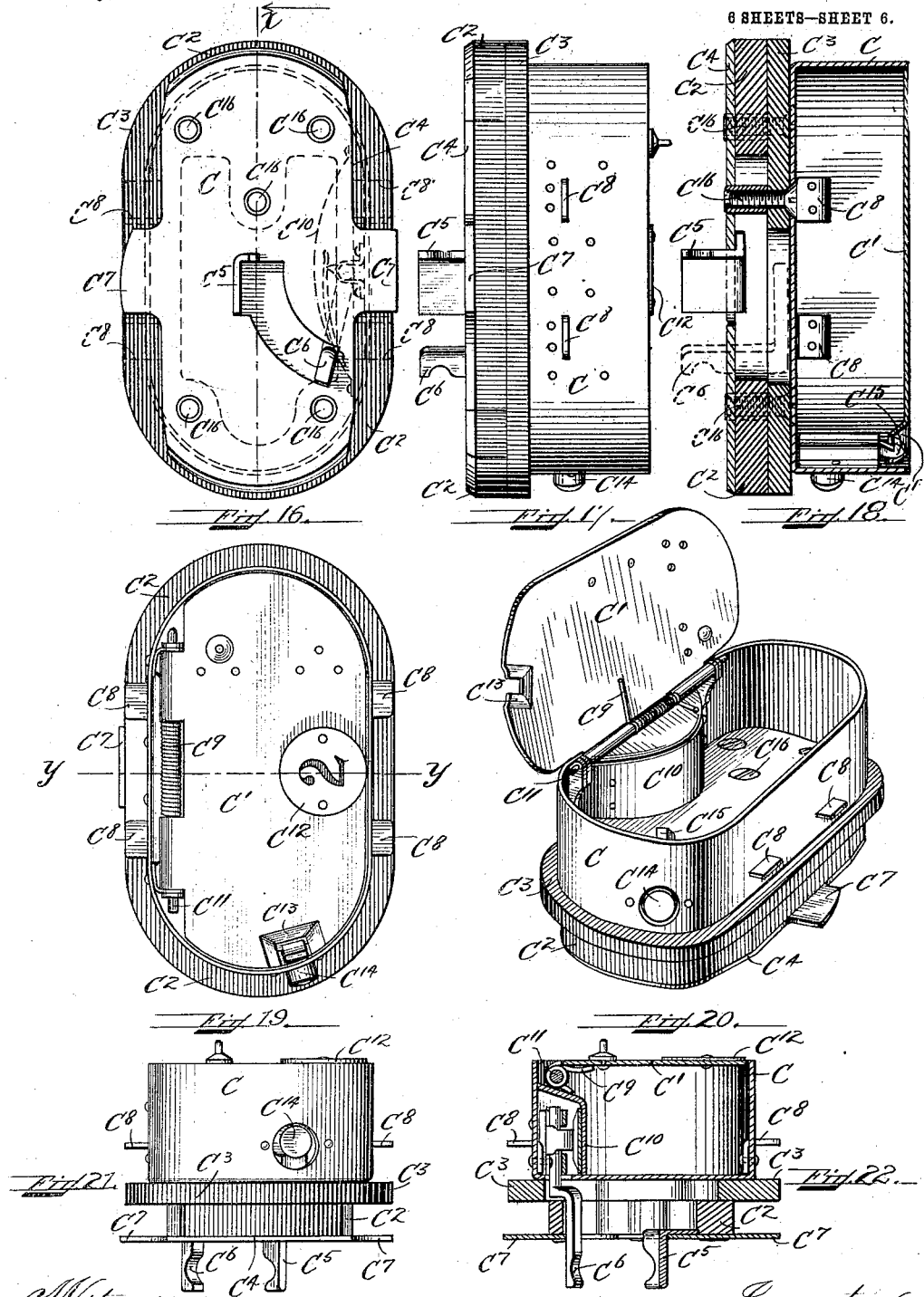

UNITED STATES PATENT OFFICE.

GEORGE A. AMSDEN, OF LOWELL, MASSACHUSETTS, ASSIGNOR TO LAMSON CONSOLIDATED STORE SERVICE COMPANY, OF NEWARK, NEW JERSEY, A CORPORATION OF NEW JERSEY.

CABLE-CARRIER APPARATUS.

960,617.  Specification of Letters Patent.  Patented June 7, 1910.

Application filed August 25, 1905, Serial No. 275,820.  Renewed January 6, 1910.  Serial No. 536,742.

*To all whom it may concern:*

Be it known that I, GEORGE A. AMSDEN, of Lowell, in the county of Middlesex and State of Massachusetts, have invented certain new and useful Improvements in Cable-Carrier Apparatus, of which the following is a specification.

My invention relates to improvements in cable carrier apparatus, and its principal object is to provide means whereby a carrier or box may be utilized running upon its side.

Another object is to provide drop-line receiving and despatching way stations for high line apparatus, and also improved switching devices for diverting the carrier from the main line to said stations.

Numerous other important features of this invention are hereinafter described and particularly pointed out in the claims.

In the accompanying drawings which illustrate a construction embodying my invention, Figure 1 is a front elevation of a high line drop receiving and despatch station. Fig. 2 is a rear elevation of Fig. 1. Fig. 3 is a perspective view of the lower portion of Fig. 1. Fig. 4 is a detail plan section of the brake spring device. Figs. 5 and 6 are opposite side elevations of Fig. 1. Fig. 7 is a perspective view showing carrier automatically dropping cable, leaving switch and taking receiving station track. Fig. 8 is a perspective view showing carrier leaving main track and taking switch to receiving station track. Fig. 9 is a plan view of horizontal outside corner. Fig. 10 is a side view of Fig. 9. Fig. 11 is a top plan view of the main line showing the switch to the receiving station. Fig. 12 is a plan view of the horizontal inside corner. Fig. 13 is a side elevation of Fig. 12. Fig. 14 is a front elevation of vertical corner. Fig. 15 is an end elevation of Fig. 14. Fig. 16 is a bottom plan view of the carrier. Fig. 17 is a side view of same. Fig. 18 is a longitudinal section on line X X Fig. 16 looking in the direction indicated by the arrow. Fig. 19 is a top plan view of a carrier. Fig. 20 is a perspective view showing the cover of the carrier open. Fig. 21 is an end view of the carrier. Fig. 22 is a sectional view on the line Y—Y Fig. 19.

Like letters of reference refer to like parts throughout the several views.

In the construction herein shown, the main tracks A or upper high line mounted one above the other and consisting of cylindrical rods or tubes, connect with the central or cashier's station and are held in alinement at intervals by the supporting brackets A'. Said brackets A' also support the lower or return tracks A² which are mounted one above the other below the upper or main track and at intervals take a vertical drop, returning to their normal or high level. These constitute drop line or way stations. The curved switch tracks A⁴ are mounted in the brackets A' above each drop line station, and consist of the thin metal strips separated sufficiently to allow the passage therein of the graduated switch guide strips C³ of the carriers C (Fig. 17). The switches A⁵ consist of portions of the main or upper tracks A cut out and so pivoted as to allow the carrier C to be diverted by engaging with the switch tracks A⁴. These switch tracks are normally held in alinement with the main line by means of the supporting bracket A⁶ connected by the spring A⁸ to the extension A⁷ which is fixed to one of the brackets A'. The receiving tracks A³ drop from the high level at each way station and are adapted to receive carriers switched from the main line at said stations. A brake spring device (Fig. 3) is provided to break the drop of the carriers and hold the same until removed from the open terminus of said receiving tracks A³. This device consists of two brackets B transversely movable on the rod B', each fixed to the outside periphery of one of the cylindrical rods or tracks A³ and springs B² connecting the said brackets serve to hold said tracks closer together causing said tracks to pinch or hold the carrier. The tracks A² at the drop station are expanded at F to permit the insertion of a carrier into coöperation with said tracks and cable D.

The propelling cable D is mounted over and supported by the grooved pulleys E journaled in bearings in the supporting brackets A' and travels in the direction indicated by the arrows. This structure is adapted to be suspended or supported by wires or any suitable device. The cable D may be driven by any suitable power.

Carriers or boxes C (Figs. 19 and 20) adapted to hold the cash or slips, consist of a box or shell C to which the cover C' is attached by means of the cover pin C¹¹ pivoted in the support C¹⁰ which support is riveted to the shell C. The spring C⁹ holds the cover open. The indentation C¹³ in the cover is adapted to engage with the catch C¹⁵ in a closed position, which catch is operated by the latch C¹⁴. This indentation allows the catch to operate without projecting above the level of the cover. The fiber plates C³ and C² are fastened to the carrier between the body and the metal or bottom plate C⁴ by screws C¹⁶. The switch fingers C⁸ are riveted to the sides of the carrier and are graduated in each carrier to engage with the switch tracks of the way station designated by the number plate C¹² upon the cover C'. The carrier travels and is guided on the tracks by means of the recesses formed between the guides C⁷ and the fiber plate C³ (Fig. 21). The spring-actuated cable grip C⁶ is adapted to maintain either an open or closed position and when closed firmly grips the cable against the fixed support C⁵.

The operation is as follows: A number of carriers C are utilized, each graduated and also numbered for one of the several drop line or way stations. These carriers C are adapted to be operated upon their sides upon the several tracks and are propelled by the cable D. The operator or clerk at the drop line or way station (for example, No. 2 as designated by the number on carrier Fig. 19 and represented in Fig. 1) desires to send cash received to cashier. The clerk opens the carrier #2 by pressing the latch C¹⁴. The money and slip are inserted into the carrier and the cover closed. The guides C⁷ on the bottom of the carrier are then inserted in the openings F and the carrier pushed slightly upward whereupon the cable grip C⁶ engages the cam G which closes said grip C⁶ upon the cable D. The carrier then travels in the direction indicated by the arrow until it reaches the cashier's station. The contents are then removed and the carrier returned to drop line station #2 in the following manner: The cashier despatches the carrier #2 upon the main or high line track as hereinbefore described, which taking the direction indicated by the arrow, arrives at junction of way station #2. The switch guides C⁸ upon this carrier (Fig. 8) engage the switch tracks A⁴ which are graduated and adjusted to coöperate only at said station #2 with said carrier #2, and the main guides C⁷ of the carriers are diverted from the main track by forcing open the switches A⁵ and passing through, the said switches then resuming their normal position. When said carrier reaches the receiving tracks A³, the cable grip engages the cam or cable releasing device H (Fig. 7) and the cable D is dropped. The carrier then leaves the switch tracks A⁴ and enters the receiving tracks A³ dropping from the high line to way station #2 until checked and stopped by the brake spring device (Fig. 3) whence it may be removed through the open terminus of track A³ of said receiving station by the clerk. The operation at each station is similarly accomplished.

Having thus described the nature of my invention and set forth a construction embodying the same, what I claim as new and desire to secure by Letters Patent of the United States is:

1. In a cable carrier apparatus, a track or way, a carrier adapted to travel upon its side on said track or way, an endless motor cable adapted to propel said carrier along said track or way, and means for engaging and disengaging said carrier with and from said cable.

2. In a cable carrier apparatus, a track or way, a carrier adapted to travel upon its side on said track or way, an endless motor cable adapted to propel said carrier along said track or way, means for placing said carrier in coöperation with said track or way, automatic means for engaging said carrier with said cable, automatic means for disengaging said carrier from said cable, and means for removing said carrier from said track or way.

3. In a cable carrier apparatus, a track or way, a carrier adapted to travel upon its side on said track or way, an endless motor cable adapted to propel said carrier along said track or way, a drop loop or depression in said track or way forming a drop or way station, means in said drop station for placing said carrier in coöperation with said track or way, and automatic means for engaging said carrier with said cable.

4. In a cable carrier apparatus, a main track or way, a carrier adapted to travel upon its side on said track or way, an endless motor cable adapted to propel said carrier along said track or way, means for placing said carrier in coöperation with said track or way, automatic means for engaging said carrier with said cable, an independent drop receiving track or way, means for diverting said carrier from said main track or way into coöperation with said drop receiving track, and automatic means for disengaging said carrier from said cable.

5. In a cable carrier apparatus, a main track or way, a carrier adapted to travel upon its side on said track or way, an endless motor cable adapted to propel said carrier along said track or way, means for placing said carrier in coöperation with said track or way, automatic means for engaging said carrier with said cable, an independent drop receiving track or way, means for diverting said carrier from said main track or way into coöperation with said drop receiving track, automatic means for disengaging said carrier from said cable, means for checking the drop of said carrier on said drop receiving track.

6. In a cable carrier apparatus, the combination with a central station, of a sending and receiving track or way, carriers adapted to travel upon their sides on said track or way, an endless motor cable adapted to propel said carriers along said track or way, an independent drop receiving track or way station, means for diverting said carriers from said sending track or way into said receiving track or way station, a drop loop on said receiving track, and means in said drop loop for returning said carriers to said central station.

7. In a cable carrier apparatus, a track or way, carriers adapted to travel upon their sides along said track or way, a motor cable adapted to propel said carriers along said track or way, a plurality of drop stations located along said track or way, and means for sending or receiving said carriers to or from any of said drop stations.

8. In a cable carrier apparatus, a track or way, a carrier adapted to travel on said track or way, an endless motor cable adapted to propel said carrier along said track or way, a drop loop or depression in said track or way forming a drop or way station, means in said drop station for placing said carrier in coöperation with said track or way, and automatic means for engaging said carrier with said cable.

9. In a cable carrier apparatus, a main track or way, a carrier adapted to travel on said track or way, an endless motor cable adapted to propel said carrier along said track or way, means for placing said carrier in coöperation with said track or way, automatic means for engaging said carrier with said cable, an independent drop receiving track or way, means for diverting said carrier from said main track or way into coöperation with said drop receiving track, automatic means for disengaging said carrier from said cable.

10. In a cable carrier apparatus, a main track or way, a carrier adapted to travel on said track or way, an endless motor cable adapted to propel said carrier along said track or way, means for placing said carrier in coöperation with said track or way, automatic means for engaging said carrier with said cable, an independent drop receiving track or way, means for diverting said carrier from said main track or way into coöperation with said drop receiving track, automatic means for disengaging said carrier from said cable, means for checking the drop of said carrier on said drop receiving track.

11. In a cable carrier apparatus, the combination with a central station of a sending and receiving track or way, carriers adapted to travel on said track or way, an endless motor cable adapted to propel said carriers along said track or way, an independent drop receiving track or way station, means for diverting said carriers from said sending track or way into said receiving track or way station, a drop loop on said receiving track, and means in said drop loop for returning said carriers to said central station.

12. In a cable carrier apparatus, an outgoing or forwarding track, an incoming or return track, a carrier adapted to travel on said tracks, an endless motor cable adapted to propel said carrier along said tracks, a loop in said incoming or return track forming a way station through which the cable travels, means in said loop station for placing said carrier into coöperation with said track and said cable, and means for engaging said carrier with said cable.

13. In a cable carrier apparatus, an outgoing or forwarding track, an incoming or return track, a carrier adapted to travel on said tracks, an endless motor cable adapted to propel said carrier along said tracks, a loop in said incoming or return track forming a way station through which the cable travels, means in the vertical portion of said loop station for placing said carrier into coöperation with said track and said cable, and means in said vertical portion of said loop station for engaging said carrier with said cable.

14. In a cable carrier apparatus, an outgoing or forwarding track, an incoming or return track, a carrier adapted to travel on said tracks, an endless motor cable adapted to propel said carrier along said tracks, a loop having a one hundred and eighty degree bend in said incoming or return track and forming a way station through which the cable travels, means in said loop station for placing said carrier into coöperation with said track and said cable, and means for engaging said carrier with said cable.

15. In a cable carrier apparatus, an outgoing or forwarding track, an incoming or return track, a carrier adapted to travel on said tracks, an endless motor cable adapted to propel said cable along said tracks, a loop in said incoming or return track forming a way station through which the cable travels, a single pulley located in the bend of said loop for supporting said cable, means in said loop station for placing said carrier into coöperation with said track and said cable, and means for engaging said carrier with said cable.

16. In a cable carrier apparatus, an outgoing or forwarding track, an incoming or return track, a carrier adapted to travel on said track, an endless motor cable adapted to propel said carrier along said tracks, a loop in said incoming or return track forming a way station through which the cable travels, means in said loop station for placing said carrier into coöperation with said track and said cable, a receiving track leading from the forwarding track, means for diverting the carrier from the forwarding track into coöperation with said receiving track, and automatic means for disengaging said carrier from said cable to allow a carrier to pass on to said receiving track from said forwarding track.

17. In a cable carrier apparatus, an outgoing or forwarding track, an incoming or return track, a carrier adapted to travel on said track, an endless motor cable adapted to propel said carrier along said tracks, a loop in said incoming or return track forming a way station through which the cable travels, means in said loop station for placing said carrier into coöperation with said track and said cable, means for engaging said carrier with said cable, a receiving track from the forwarding track, means for diverting the carrier from the forwarding track into coöperation with said receiving track, automatic means for disengaging said carrier from said cable to allow said carrier to pass on to said receiving track from said forwarding track, and means for checking the drop of said carrier on to said receiving track.

18. In a cable carrier apparatus, an outgoing or forwarding track formed of rods, a carrier adapted to travel on said track, an endless motor cable adapted to propel the carrier along said track, a receiving track leading from the forwarding track at a way station, means for diverting the carrier from said forwarding track into coöperation with said receiving track, pivoted sections in said rods whereby said diverting means may move said carrier from said forwarding track on to the receiving track, and automatic means for disengaging said carrier from said cable to allow said carrier to pass on to said receiving track from said forwarding track.

In testimony whereof, I have signed my name to this specification in the presence of two subscribing witnesses, this twenty-third day of August A. D. 1905.

GEORGE A. AMSDEN.

Witnesses:
A. L. MESSED,
LOUIS G. BARTLETT.